UNITED STATES PATENT OFFICE.

JAMES H. STEBBINS, JR., OF NEW YORK, N. Y.

IMPROVEMENT IN COLORING-MATTERS OBTAINED FROM SALICYLIC ACID.

Specification forming part of Letters Patent No. 221,118, dated October 28, 1879; application filed April 23, 1879.

*To all whom it may concern:*

Be it known that I, JAMES H. STEBBINS, Jr., of the city, county, and State of New York, have invented a new and useful Improvement in Coloring-Matters, which improvement is fully set forth in the following specification.

This invention relates to a coloring-matter which I call "salicylidine," and which is obtained by the reaction of diazo-benzole nitrate on salicylic acid.

In carrying out my invention a quantity of salicylic acid is dissolved in alcohol, and this alcoholic solution is treated with an aqueous solution of diazo-benzole nitrate.

The proportion in which the various ingredients are used is about as follows: Ten ounces of salicylic acid are dissolved in about one hundred ounces of alcohol, one ounce of diazo-benzole nitrate is dissolved in about one hundred ounces of water, and these solutions are poured together.

As soon as the solution of diazo-benzole nitrate is added to the solution of salicylic acid the mixture turns ruby-red, and after a short time a large number of dark-brown crystals make their appearance. These crystals are collected on a filter and dried, and, if desired, they may be purified by recrystallization. They form my new coloring-matter. This coloring-matter dissolves readily in alcohol, but is only sparingly soluble in water; but by converting it into a soda-salt or sulpho-salt it becomes soluble in water.

It dyes silk of an orange-red color without mordants. Wool is dyed of a salmon color with a tannic-acid mordant. Silk, if mordanted with muriate of tin, is dyed red.

What I claim as new, and desire to secure by Letters Patent, is—

As a new manufacture, the coloring-matter or dye-stuff obtained from the reaction of diazo-benzole nitrate on salicylic acid, substantially in the manner set forth, or by any other method which will produce a like result.

In testimony that I claim the foregoing I have hereunto set my hand and seal this 19th day of April, 1879.

JAMES H. STEBBINS, JR. [L. S.]

Witnesses:
    W. HAUFF,
    E. F. KASTENHUBER.